United States Patent
Lopez Pascual

(10) Patent No.: US 12,112,188 B2
(45) Date of Patent: Oct. 8, 2024

(54) CUSTOMIZED INITIALIZATION CODE DELIVERY OVER NETWORK FOR ZERO-TRUST VIRTUAL MACHINE

(71) Applicant: Red Hat, Inc., Raleigh, NC (US)

(72) Inventor: Sergio Lopez Pascual, Saragossa (ES)

(73) Assignee: Red Hat, Inc., Raleigh, NC (US)

( * ) Notice: Subject to any disclaimer, the term of this patent is extended or adjusted under 35 U.S.C. 154(b) by 495 days.

(21) Appl. No.: 17/536,344

(22) Filed: Nov. 29, 2021

(65) Prior Publication Data

US 2023/0168911 A1    Jun. 1, 2023

(51) Int. Cl.
*G06F 9/455* (2018.01)
*G06F 9/4401* (2018.01)
*H04L 9/40* (2022.01)

(52) U.S. Cl.
CPC ........ *G06F 9/45558* (2013.01); *G06F 9/4401* (2013.01); *H04L 63/0428* (2013.01); *G06F 2009/45575* (2013.01); *G06F 2009/45587* (2013.01)

(58) Field of Classification Search
CPC ............... G06F 9/45558; G06F 9/4401; G06F 2009/45575; G06F 2009/45587; H04L 63/0428
See application file for complete search history.

(56) References Cited

U.S. PATENT DOCUMENTS

| | | | |
|---|---|---|---|
| 11,080,403 B1* | 8/2021 | Taylor | G06F 21/566 |
| 2013/0290694 A1* | 10/2013 | Civilini | H04L 41/0806 |
| | | | 713/2 |
| 2018/0150306 A1* | 5/2018 | Govindaraju | G06F 9/44505 |
| 2020/0257518 A1 | 8/2020 | Liedtke et al. | |
| 2021/0105258 A1 | 4/2021 | Sood et al. | |
| 2021/0105260 A1 | 4/2021 | Tsirkin | |
| 2021/0200874 A1 | 7/2021 | Markey et al. | |
| 2021/0263759 A1* | 8/2021 | Pascual | H04L 9/3263 |

\* cited by examiner

*Primary Examiner* — Diem K Cao
(74) *Attorney, Agent, or Firm* — Dority & Manning, P.A.

(57) ABSTRACT

The technology disclosed herein enables customized hardware initialization code to be provided over a computer network and used to enable a virtual machine to boot in a more secure manner. An example method may include: receiving a request to start a virtual machine; transmitting, by a processing device, configuration data of a host device over a computer network to a service, wherein the configuration data comprises a resource identifier of the host device; receiving hardware initialization code over the computer network from the service, wherein the hardware initialization code comprises the resource identifier; updating, by the processing device, the virtual machine to comprise the hardware initialization code; and causing the virtual machine to execute in a trusted execution environment of the host device, wherein the virtual machine executes the hardware initialization code and uses the resource identifier.

20 Claims, 7 Drawing Sheets

CUSTOMIZED INITIALIZATION CODE DELIVERY OVER NETWORK FOR ZERO-TRUST VIRTUAL MACHINE

TECHNICAL FIELD

The present disclosure generally relates to computer security, and more specifically relates to customizing the hardware initialization code that a virtual machine executes when it is booting.

BACKGROUND

Modern computer systems use trusted execution environments (TEEs) and other aspects of confidential computing to enhance computer security. It is common for the computer systems to encrypt data when the data is stored on disk and when the data is in transit and with confidential computing the data can also be encrypted while the data is in-use (e.g., stored in memory or processor cache). The trusted execution environments can be implemented at a hardware level using a central processing unit (CPU). The CPU can provide hardware-level encryption that protects the data of a process from being accessed by the kernel that manages the process. In computer systems that use hardware virtualization, an entire virtual machine (VM) can be executed in a trusted execution environment and the data of the virtual machine that is stored in host memory can be inaccessible to the hypervisor and host operating system that manages the virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
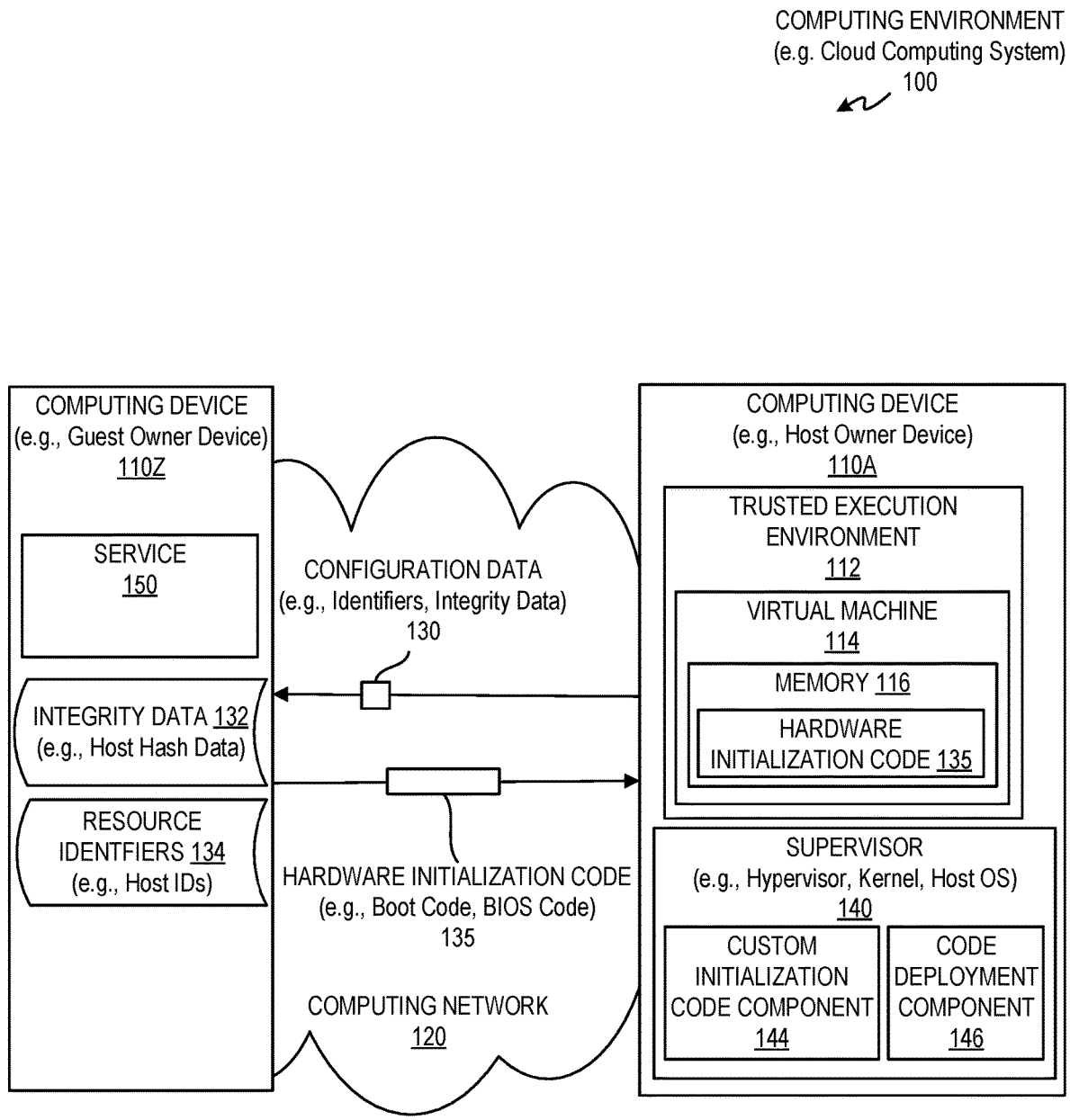
FIG. 1 depicts a high-level block diagram of an example computing environment that includes a service that can customize the hardware initialization code used to boot a virtual machine, in accordance with one or more aspects of the present disclosure.

Confidential computing is often used to enhance data security in multiparty computing environments. An example of a multiparty computing environment, is a cloud computing environment where a host owner operates host machines and a guest owner operates the guest machines running on the host machines. The host owner provides a hypervisor that manages the virtual machines and the guest owner can provide the guest operating system or other executable code running on each virtual machine (i.e., guest machine). The guest owner can provide executable code as a virtual machine image (VM Image) that is encrypted. The use of confidential computing enables the virtual machine to be run in a trusted execution environment to protect the data (e.g., VM Image) provided by the guest owner from being accessed by the hypervisor after it is loaded into the virtual machine. But some of the data loaded into the virtual machine can be provided by the hypervisor and can be used to compromise the security of the virtual machine.

When a virtual machine is started it performs a boot process by executing code that is typically provided by the host owner (e.g. hypervisor or host operating system). The code includes hardware initialization code that performs the beginning stage of the boot process for a virtual machine and may be similar to the Basic Input/Output System (BIOS) code used in older computers. The hardware initialization code may execute and retrieve configuration data of the host device from the hypervisor, host operating system, device firmware, or other portion of the host machine. The hardware initialization code can be a source of vulnerabilities for the virtual machine because the hardware initialization code can be compromised or it can be provided configuration data that is compromised.

Aspects of the present disclosure address the above and other deficiencies by including a service that can provide customized hardware initialization code that a virtual machine can use to boot in a more secure manner. The service can be provided by the guest owner (e.g., cloud consumer) and can receive and verify configuration data of a host device provided by the host owner (e.g. cloud provider). The service may generate or select hardware initialization code based on the configuration data and may embed portions of the configuration data (e.g., CPU identifiers, location of guest memory) into the hardware initialization code to create customized hardware initialization code. The service can enable the guest owner to provide the customized hardware initialization code to the virtual machine and avoid the virtual machine from executing hardware initialization code provided by the host owner or relying on unverified configuration data provided by the host owner. In one example, the service can further customize the hardware initialization code by removing all conditional code that branches based on the various configurations. This may enable the customized hardware initialization code to perform its portion of the boot process while traversing a single code path and reduces the amount of code loaded or executed by the virtual machine.

The technology described herein improves the field of computer security by enhancing the use of Confidential Computing (e.g., Trusted Computing). The technology enhances confidential computing by enabling a guest owner to verify configuration data of the host device that is provided to the virtual machine when the virtual machine is booted. The technology may also enable the guest owner to verify the hardware initialization code that is used to boot the virtual machine. As discussed above, the hardware initialization code can be customized to reduce the amount of code and the amount of data being retrieved by the code. This can greatly reduce the attack surface of the virtual machine and can also optimize the booting of the virtual machine to boot more quickly, to boot with less memory, or a combination thereof.

Various aspects of the above referenced methods and systems are described in details herein below by way of examples, rather than by way of limitation. The examples provided below discuss a computing environment that uses a combination of confidential computing and hardware virtualization and executes virtual machines in trusted execution environments. In other examples, the confidential computing features can be substituted with a different technique to provide integrity verification or confidentiality and the computing environment may be include a substitute for the trusted execution environments. In yet another example, the host device may be absent virtualization or include a different or an additional virtualized execution environment, such as operating system virtualization (e.g., containers).

FIG. 1 depicts an illustrative architecture of elements of a computing environment 100, in accordance with an example of the present disclosure. Computing environment 100 may include an infrastructure for verifying the integrity of computing devices and may be referred to or function as a zero-trust infrastructure, integrity infrastructure, verification infrastructure, or attestation infrastructure. It should be noted that other architectures for computing environment 100 are possible, and that the implementation of a computing environment utilizing embodiments of the disclosure are not necessarily limited to the specific architecture depicted. In the example shown in FIG. 1, computing environment 100 may include a computing device 110A that can be owned by a host owner and can be referred to as a host device and computing device 110Z that can be owned by a guest owner and can be referred to as a guest owner device or guest device. The guest owner and host owner may be different entities (e.g., organizations, companies, departments, team, persons) and in one example, the host owner may be a cloud provider and the guest owner may be a cloud consumer. The guest owner may not fully trust the devices of the host owner and may implement a zero trust architecture.

The zero trust architecture may be a computing architecture in which different computing devices begin with zero trust and implement a relationship in which the devices "never trust, always verify." This causes the computing devices to not trust by default, even if they are connected to a managed network (e.g., corporate LAN) and even if the computing devices were verified in the past. The zero trust architecture involves mutual authentication and checking the identity and integrity of computing devices. This involves providing access to code and services after verifying the computing device. The zero trust architecture (ZTA) can be the same or similar to a zero trust security model, perimeterless security, a zero trust network architecture (ZTNA), other term, or a combination thereof. The zero trust architecture can include multiple computing device 110A-Z that are connected over computer network 120.

Computer network 120 may include one or more public networks (e.g., the internet), private networks (e.g., a local area network (LAN) or wide area network (WAN)), or a combination thereof. In one example, computer network 120 may include a wired or a wireless infrastructure, which may be provided by one or more wireless communications systems, such as a wireless fidelity (WiFi) hotspot connected with the computer network 120 and/or a wireless carrier system that can be implemented using various data processing equipment, communication towers, etc.

Computing devices 110A-Z may be or include one or more servers, workstations, personal computers (e.g., desktop computers, laptop computers), mobile computers (e.g., mobile phones, palm-sized computing devices, tablet computers, personal digital assistants (PDAs)), network devices (e.g., routers, switches, access points), storage devices (e.g., Network Attached Storage (NAS), Storage Area Network (SAN)), other devices, or a combination thereof. In one example, computing devices 110A-Z may be part of a cloud computing system (e.g., public cloud, private cloud, hybrid cloud), an on-premise computing system (e.g., company server), other system, or a combination thereof.

Computing device 110A is an example of a host owned device and may be configured to support one or more levels of virtualization and may be referred to as a host device, host machine, or other term. The virtualization levels may include hardware level virtualization (e.g., virtual machines (VMs)), operating system level virtualization (e.g., Containers), or other virtualization. Computing device 110A may include one or more hardware platforms with processors based on x86, PowerPC®, SPARC®, ARM®, other hardware architecture, or a combination thereof. Computing device 110A may include a combination of hardware and programing (e.g., Trusted Computing (TC), Trusted Computing Base (TCB)) that supports confidential computing and can establish one or more trusted execution environments 112.

Trusted execution environment 112 (TEE) may protect data using techniques that enhance data confidentiality, data integrity, data availability, or a combination thereof. Trusted execution environments 112 may protect the data using hardware based encryption that isolates the data of one or more processes (e.g., VM) while it is in use by a processor and protects the data from other processes running on the same computing device. In one example, the data of a process executing in the trusted execution environment may be encrypted using cryptographic keys that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., virtual machine process) executing within the trusted execution environment from being accessed by a higher privileged processes (e.g., hypervisor or host OS) even though the higher privileged processes may be responsible for managing the lower privileged process. Trusted execution environments 112 may provide code execution, storage confidentiality, and integrity protection, and may store, execute, and isolate data of a virtual machine from other processes executing on the same computing device, as discussed in more detail in regards to FIG. 3.

Computing device 110Z can be an example of a computing device that is maintained by a guest owner and is communicable coupled with computing device 110A that is maintained by the host owner. In one example, computing device 110A and 110Z may be located in the same cloud computing system or in different cloud computing systems. In another example, computing device 110A may be located in a cloud computing system and computing device 110Z may be an on-premise device at a location owned or operated by the guest owner. Computing device 110Z may run a service 150 that can communicate with computing device 110A over computer network 120. Service 150 is discussed in detail in regards to FIG. 2 and can access configuration data 130 of computing device 110A and provide customized hardware initialization code to computing device 110A.

Configuration data 130 can be any data that represents a configuration of a computing device that is hosting or will host a virtual machine for the guest owner. Configuration data 130 can include data that is specific to one or more virtual machines 114 (e.g., vCPU, guest memory), that is general to one or more host devices, or a combination thereof. Configuration data 130 can include version data (e.g., version numbers), model data (e.g., model number), feature data (e.g., security features), identification data (e.g., CPU ID, process ID, memory address), other data, or a combination there. Configuration data 130 can correspond to any computing resource of computing device 110A and can describe hardware resources or programming resources.

Configuration data for hardware resources can be referred to as hardware configuration data and configuration data for programing resources can be referred to as program configuration data. The hardware configuration data can include data that represents a configuration of a hardware platform of computing device 110A and includes data about the processors (e.g., CPU, GPU, and controllers), primary storage devices (e.g., main memory), secondary storage devices (e.g., hard drive, solid state drive), networking devices, graphics devices, other devices, or a combination thereof. The program configuration data can include data that represents a configuration of programs that are embedded, installed, or executed by computing device 110A. The programs can include one or more kernels, hypervisors, applications, utilities, device drivers, system firmware, device firmware, other program, or a combination thereof. In one example, configuration data 130 can include data of a hardware platform, a trusted execution environment, executable code, or a combination thereof and can include integrity data and one or more resource identifiers.

Integrity data 132 can be data that represents the integrity of a device or program and enables a recipient device or program to verify the integrity of the sender device or program. As illustrated by FIG. 1, computing device 110Z can receive integrity data from computing device 110A and store it as integrity data 132. Integrity data 132 can be based on the configuration of the sending computing device and can be obtained or generated by the hardware platform of the sending computing device (e.g., processor, memory controller, firmware, BIOS). Integrity data 132 may be the same or similar to hash data (e.g., hash, digital signature), measurement data (e.g., quote data, report data), identification data (e.g., processor model or security version), cryptographic data (e.g., certificates, authentication keys, signature keys, endorsement keys, session keys, encryption or decryption keys), configuration data (e.g., program version, hardware version, firmware version, security version, settings, registry data), other data, or a combination thereof.

In one example, computing device 110A (e.g., host device) can generate the integrity data by hashing integrity data of one or more different portions of the computing device using a hashing function (e.g. cryptographic hashing function). The hashing may involve performing one or more hashes using the same hash function or different hash functions. The hashing may involve a hash chain that provides the output of a first hash function as input to a second hash function. The first and second hash functions may be the same or different hash functions. In one example, integrity data may be generated by generating or obtaining integrity data of one or more layers of the computing device 110A and the layers may correspond to hardware device layer (e.g., hardware platform integrity data), program layer (e.g, code integrity data), other layer, or a combination thereof.

Resource identifiers 134 can include unique identifiers for computing resources of computing device 110. A resource identifier can include numeric data, non-numeric data, or a combination thereof. Resource identifiers 134 can correspond to a physical computing resources, logical computing resources, virtual computing resources, other resources, or a combination thereof. Resource identifiers 134 can be generated by a device manufacturer, program developer, an operating system, hypervisor, device driver, virtual machine, application, other device or program, or a combination thereof. Example resource identifiers 134 can include a processor identifier (e.g., CPU ID, virtual CPU (vCPU) ID), memory identifier (e.g., memory address of guest memory), persistent storage identifier (e.g., volume, partition, drive), network identifier (e.g., MAC address, TCP/IP address, port number), adapter identifier (e.g., network adapter, graphics adapter), computer name, user account, descriptor, handle, other data structure, or a combination thereof. Resource identifiers 134 and configuration data 130 can be used by service 150 to select, update, or generate hardware initialization code 135.

Hardware initialization code 135 may be executable code that is used to initialize computing resources of a physical machine, virtual machine, or a combination thereof. The initialization can be the same or similar to a boot process (e.g., reboot), startup process (e.g., VM start), resume process (e.g., VM resume), power-on process, other process or a combination thereof. As shown in FIG. 1, hardware initialization code 135 can be received by computing device 110A and loaded into memory 116 of a virtual machine 114. Hardware initialization code 135 may perform control, monitoring, and data manipulation functions and contain basic low-level functions to communicate with computing resources and provide hardware abstraction services and runtime services to higher-level programs such as operating systems. Hardware initialization code 135 may or may not test one or more of the computing resources and may be the same or similar to firmware code (e.g., system firmware, platform firmware), Basic Input/Output System (BIOS) code, Unified Extensible Firmware Interface (UEFI) code, other code, or a combination thereof. In one example, hardware initialization code 135 can be or include code of a boot loader.

A boot loader can include executable code that performs a portion of a boot process. The boot loader can start the initialization sequence for the boot process and include one or more small computer programs (e.g., 64 kilobyte program). The boot process can involve one or more boot loaders that perform one or more stages. For example, there may be a single multiple-stage boot loader or there can be multiple single stage boot loaders. The multiple boot loaders can include a first stage boot loader and a second stage boot loader. The first stage boot loader can perform the beginning stage of the boot process and can being in response to a request to start a machine. The request may be a signal or message to power on, start, resume, or continue a virtual machine (e.g., press power button, VM start, VM resume), other request, or a combination thereof. The first stage boot loader may initialize computing resource for the virtual machine and end by transitioning execution to a second stage boot loader, which may be part of a kernel (e.g., guest kernel, guest operating system). The different boot loaders can be different programs that can execute one after the other and perform chain loading.

The chain loading can involve replacing a currently executing program with a new program and using a common data area to pass information from the current program to the new program. Chain loading can involve the memory of a program (e.g., program image) for a current process being completely or partially replaced with a different program image (e.g., an entirely new image) and the current process begins execution of the different program image. In one example, the hardware initialization code 135 can be the same or similar to boot code, boot loader code, boot manager code, other term, or a combination thereof. Hardware initialization code 135 can be generated by service 150 on computing device 110Z and transmitted to the supervisor 140 of computing device 110A.

Supervisor 140 may receive hardware initialization code 135 and may update virtual machine 114 to include hardware initialization code 135. Supervisor 140 may be one or more computing programs running on computing device 110A and can be the same or similar to a hypervisor, host operating system, kernel, other program, or a combination thereof. As shown in FIG. 1, supervisor 140 can include a code customization component 144 and a code deployment component 146. Code customization component 144 can enable supervisor 140 to determine and transmit configuration data 130 and to receive hardware initialization code 135. Code deployment component 146 can enable supervisor 140 to update the virtual machine 114 to include and execute the hardware initialization code 135. The selection, customization, transmission, and use of hardware initialization code 135 is discussed in more detailed in regards to FIG. 2.

Figure 2:
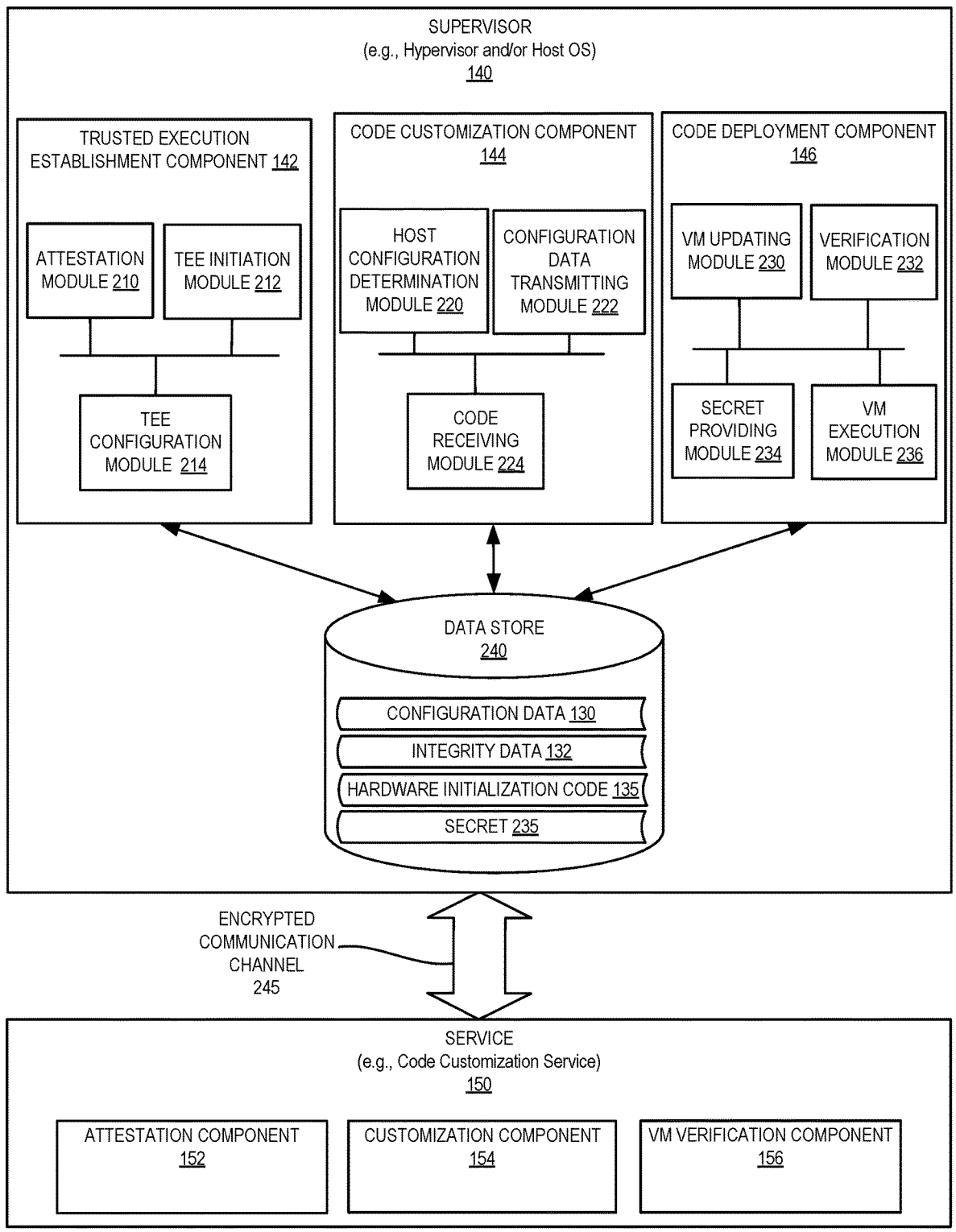
FIG. 2 depicts a detailed block diagram of example of the service and supervisor of FIG. 1, in accordance with one or more aspects of the present disclosure.

FIG. 2 depicts a block diagram illustrating an exemplary supervisor 140 and service 150 that can communicate with one another to customize and execute hardware initialization code 135, in accordance with one or more aspects of the present disclosure. The features of the components and modules of FIG. 2 may be implemented as hardware logic (e.g., integrated circuits), programing logic (e.g., executable code), other logic, or a combination thereof. The hardware logic may be included in one or more central processing units (e.g., x86, ARM, Power CPUs), secure cryptoprocessors (e.g., Hardware Security Module (HSM), Trusted Platform Module (TPM)), memory controllers, cache controllers, other processors, or a combination thereof. The programming logic may be included as executable code in device firmware, device drivers, kernels, hypervisors, operating systems, container runtimes, applications, other programs, or a combination thereof.

More or less components or modules may be included without loss of generality. For example, two or more of the components may be combined into a single component, or features of a component may be divided into two or more components. In the example shown, the features of the components may execute on different computing devices (e.g., device of host owner and device of guest owner). In other examples, the components may execute on more than two devices or on a single device or other combination of physical devices, virtual devices, or combination thereof. In the example illustrated in FIG. 2, supervisor 140 (e.g., hypervisor and/or host OS) may include a trusted execution establishment component 142, a code customization component 144, a code deployment component 146, and a data store 240 and service 150 may include an attestation component 152, a customization component 154, and a VM verification component 156.

Trusted execution establishment component 142 may enable computing device 110A executing supervisor 140 to establish one or more trusted execution environments 112. Establishing a trusted execution environment 112 may involve creating a new trusted execution environment or updating an existing trusted execution environment. Each of trusted execution environment 112 may execute a virtual machine 114. In one example, trusted execution establishment component 142 can include an attestation module 210, a TEE initiation module 212, and a TEE configuration module 214.

Attestation module 210 may enable supervisor 140 to perform an integrity check to verify the integrity of computing device 110A. Attestation module 210 may enable a program to check the capabilities of computing device 110A and to detect unauthorized changes to programs, hardware devices, data, other portions of computing device 110A, or a combination thereof. The unauthorized changes may be the result of malicious, defective, or accidental actions by a program or hardware device. Attestation module 210 may perform one or more attestation operations to access or generate integrity data and may store the integrity data. Storing the integrity data may involve storing it as integrity data 132 in data store 240, which may be a non-persistent storage device (e.g., main memory), in a persistent storage device (e.g., HDD, SDD, NAS, SAN), or a combination thereof. The storage devices may be internal or external to computing device 110A.

Attestation module 210 may perform an attestation process that involves one or more local attestations, remote attestations, or a combination thereof. A local attestation may involve enabling a program executed locally on computing device 110A to verify the integrity of computing device 110A. A remote attestation may involve enabling a program executed remotely on a different computing device (e.g., computing device 110Z) to verify the integrity of computing device 110A. The remote attestation may be performed non-anonymously by disclosing data that uniquely identifies computing device 110A or anonymously without uniquely identifying computing device 110A (e.g., Direct Anonymous Attestation (DAA)). Attestation module 210 may perform operations before, during, or after trusted execution environment 112 is established on computing device 110A and may provide integrity data that is specific to the initiation, configuration, or execution of the trusted execution environment 112. Attestation module 210 may enable supervisor 140 to communicate over computer network 120 with attestation component 152 of service 150.

Attestation component 152 may enable computing device 110Z executing service 150 to access and verify the integrity data of computing device 110A. Attestation component 152 may access integrity data of the host device and verify integrity data 132. Verifying the integrity data may involve service 150 verifying the integrity of a host device, virtual machine, trusted execution environment, or a combination thereof. Attestation module 210 and attestation component 152 can be used individually or together to verify integrity data 132. The verifying may be referred to as a verification, an integrity check, verification check, appraisal, platform authentication, or other term.

The verifying may involve executing one or more verification functions. The verification functions may be executed by computing devices 110A-Z, service 150, supervisor, other device or program, or a combination thereof.

The verification functions may take as input the integrity data and provide output that indicates whether the host device is verified (e.g., trusted). In one example, the integrity data may include hash data (e.g., certificate chain) and the verification function may analyze a portion of hash data to generate validation data. The verification function may then compare the received integrity data with the generated validation data to perform the integrity check or verification check (e.g., compare received hash with a generated hash).

TEE initiation module 212 may enable computing device 110A executing supervisor 140 to initiate the establishment of trusted execution environment 112 before, during, or after the execution of attestation module 210. TEE initiation module 212 may execute one or more instructions recognized by the processor (e.g., Intel TDX opcodes, AMD SEV opcodes, ARM TrustZone opcodes). The instructions may be called by a program associated with supervisor 140 (e.g., kernel, operating system, hypervisor, host OS), virtual machine 114 (e.g., guest OS), hardware initialization code 135 (e.g., boot loader), firmware, Basic Input Output Services (BIOS), hardware adapter, other entity, or a combination thereof. In one example, a program (e.g., program of supervisor) may initiate the creation of trusted execution environment 112 and trusted execution environment 112 may be used for executing another program (e.g., program of virtual machine). In another example, a program that will execute in trusted execution environment 112 may initiate the creation of the trusted execution environment. In either example, after trusted execution environment 112 is initiated it may be configured by TEE configuration module 214.

TEE configuration module 214 may enable computing device 110A executing supervisor 140 to configure trusted execution environment 112 to store and execute data of virtual machine 114. TEE configuration module 214 may configure trusted execution environment 112 in view of configuration data provided by a process initiating or using the trusted execution environment, by a processor, storage device, other portion of computing device 110A, or a combination thereof. The configuration may be provided as input before, during, or after trusted execution environment 112 is initiated, created, or updated. As discussed below in regards to FIG. 3, trusted execution environment 112 may include a trusted storage area, a trusted processor area, trusted IO, or a combination thereof and the configuration may correspond to configuring one or more of these. For example, the configuration may correspond to an execution construct data (e.g., virtual machine identifier (VMID), processes identifier (PID)), storage data (e.g., storage size or location), cryptographic data (e.g., encryption key, decryption key, seed, salt, nonce), other data, or a combination thereof. One or more of these may be configured or customize and associated with the trusted execution environment for virtual machine 114. In one example, trusted execution environment 112 may include an encrypted storage area and the configuration may indicate a size of the encrypted storage area that will be allocated to store data of virtual machine 114 (e.g., size of guest physical memory).

TEE configuration module 214 may configure different aspects of the trusted execution environment to use different cryptographic techniques. The different cryptographic techniques may use different cryptographic functions, cryptographic settings, cryptographic keys, cryptographic inputs, other cryptographic data, or a combination thereof. In one example, data of a computing process that will be executed by the trusted execution environment 112 may be encrypted using a first cryptographic technique (e.g., encrypted using a location independent transport key) when loaded by the processor and may be encrypted using a second cryptographic technique (e.g., encrypted using a location dependent storage key) when stored in the encrypted storage area. This may be advantageous because the data may be more vulnerable to attack when it is stored on a removable storage device (e.g., memory module) then when it is transferred over the system bus and therefore different cryptographic techniques may be used.

Code customization component 144 can enable the computing device executing supervisor 140 to communicate with service 150 to acquire customized hardware initialization code 135. In one example, code customization component 144 can include an attestation module 210, a host configuration determination module 220, a configuration data transmitting module 222, and a code receiving module 224.

Host configuration determination module 220 can enable supervisor 140 to determine configuration data 130 of the host device. Determining configuration data 130 can involve accessing data, requesting data, or generating data. Accessing data can involve supervisor 140 accessing stored data from one or more particular storage objects (e.g., configuration files), particular storage locations (e.g., processor registers, boot sector), or storage devices (e.g., ROM, main memory, hard drive, solid state drive), or other portion of the host device. The stored data could include data that was previously acquired by the supervisor before, during, or after supervisor 140 began executing on host device. Requesting the data can involve sending requests to one or more computing resources of the host device and receiving data in response. As discussed above, the computing resources can include hardware resources (e.g., CPU, host memory, or secondary storage) and programming resources (e.g., host operating system, hypervisor, applications). Generating data can involve analyzing the accessed or requested data and generating configuration data based on the accessed data. The generating can involve combining, aggregated, transforming, formatting, encrypting, hashing, other operation, or a combination thereof. The resulting data can be stored and transmitted as configuration data 130. In one example, configuration data 130 of the host device describes one or more computing resources available to virtual machine 114 and indicates at least one of a CPU quantity, a memory capacity, an instruction set architecture (ISA), and hardware-level encryption support, and resource identifier of the host device.

Configuration data transmitting module 222 can enable supervisor 140 to transmit configuration data 130 of the host device over a computer network to service 150. Transmitting the configuration data to the service can involve directly transmitting or indirectly transmitting the configuration data to the service. Directly transmitting the configuration data can involve supervisor 140 transmitting configuration data 130 from supervisor 140 to service 150. This can involve using one or more network messages (e.g., network packets, TCP/IP packets) that include configuration data 130 and are addressed to the computing device executing supervisor 140 (e.g., network address of computing device 110Z). Indirectly transmitting the configuration data can involve transmitting configuration data 130 over a computer network to a device or storage location that is accessible to service 150. This may involve using one or more network messages that include configuration data 130 and are addresses to an intermediate device or storage location that is different from the computing device executing supervisor 140. In either example, the transmitting can be the same or similar to providing, enabling access to, or sending configuration data 130 and can involve one or more of encrypted communication channel 245.

Encrypted communication channel 245 may be a security enhanced communication channels that connects computing device 110A with one or more other computing devices (e.g., computing device 110Z or intermediate device). Encrypted communication channel 245 may connect any portion of computing devices 110A and 110Z. For example, service 150 can be connected with supervisor 140, virtual machine 114, trusted execution environment 112, other portion of a host device, or a combination thereof. In one example, encrypted communication channel 245 may connect service 150 with the trusted execution environment 112 and may be established by the hardware platform (e.g., processor). The data that is transferred over encrypted communication channel 245 can use hardware based encryption so that the data is accessible to the hardware platform and trusted execution environment 112 without being accessible to any process executed external to trusted execution environment 112. In either example, service 150 can receive the configuration data 130 and provide it to customization component 154.

Customization component 154 can enable service 150 to customize hardware initialization code 135 and to transmit the hardware initialization code 135 over computer network 120 to supervisor 140. Customizing the hardware initialization code can involve selecting hardware initialization code (e.g., template code, default code, base code) and updating the selected hardware initialization code. The selecting can involve identifying based on the configuration data a candidate hardware initialization code from a set of one or more hardware initialization code candidates. In one example, the candidates can be the same or similar to the hardware initialization code that is included with a hypervisor and can be packaged with the hypervisor, installed with hypervisor, available to the hypervisor, host OS, host device, or a combination thereof.

The candidates in the set can correspond to different configurations of the host device. As discussed above, a configuration can be based on a combination of hardware resources, programming resources, other computing resources, or a combination thereof. A particular combination can correspond to one or more particular candidates or a particular candidate can correspond to one or more particular combinations. For example, different candidates may be used for different hardware resource types (e.g., x86 vs. PowerPC), hardware resource manufacturers (e.g., AMD vs. Intel), programming resource (e.g., Linux vs. Windows), and so on.

The set can include one or more data structures and selecting a candidate from the set can involve analyzing the data structure based on configuration data 130. In one example, the set can be an n-dimensional matrix (e.g., one-dimensional list, a two dimensional table, index, array, etc.) and each element in the matrix can correspond to a candidate. Selecting the candidate can involve evaluating the configuration data to identify a particular element (e.g., particular row, column, layer, etc). In another example, the set can be a graph and one or more of the edges or nodes can correspond to candidates in the set. Selecting the candidate can involve traversing the graph based on the configuration data to find the corresponding candidate (e.g., traverse from root node to leaf node). In either example, the selected hardware initialization code candidate can function as a template that can be updated.

Customization component 154 can enable service 150 to update the selected hardware initialization code based on configuration data 130. The hardware initialization code can include executable data (e.g., code), non-executable data (e.g., information), other data, or a combination thereof. Customization component 154 can update the hardware initialization code by modifying assembly code, source code, object code, compiled code, interpreted code, intermediate code, statically linked code, dynamically linked code, machine code, binary code, or a combination thereof. In one example, the hardware initialization code can include executable code in binary form (e.g., binary code) and customization component 154 can search or scan the executable code to identify and update one or more variables, functions, instructions, data structures, objects, members, elements, or other code construct. The code construct (e.g., variable) can be updated to modify the initialization, assignment, or access to the code construct, modify the type of the code construct (e.g., change variable to constant), modify a value of the code construct (e.g., change variable value or return type), other change, or a combination thereof.

The update can involve one or more operations to add data, remove data, or a combination thereof. Adding data to the hardware initialization code can involve hard coding, embedding, replacing, copying, moving, appending, concatenating, including, or other operation that adds a portion of the configuration data (e.g., CPU ID, core count, memory address) to the hardware initialization code. In one example, the adding may involve hard coding the configuration data into the executable code of the hardware initialization code. Removing data from the hardware initialization code can involve updating the hardware initialization code so that the hardware initialization code is absent, lacking, excluding, missing, or free of particular executable data, non-executable data, or a combination thereof. In one example, removing data can involve removing any and all code that accesses, requests, retrieves, or generates configuration data of the host device (e.g., from hypervisor, host operating system, or computing resource of computing device 110A).

In one example, customization component 154 can update hardware initialization code 135 to minimize the code paths present in the customized version of the hardware initialization code. Minimizing the code paths can involve removing the number of code paths, removing the length of the code paths, or a combination thereof. Traditional hardware initialization code can include retrieval code that retrieves configuration data from a host device and includes conditional code that evaluates the configuration data to determine which of multiple code paths to traverse. The conditional code can include comparison code (e.g., if/then, if, if-else, else), branch code (e.g., branch instruction, jump instruction, function call), and subsequent code (e.g., code along new branch). The comparison code can be evaluated based on one or more values that are included in the configuration data or derived from the configuration data and can cause the branch code and subsequent code to be executed.

Updating the hardware initialization code to minimize the code paths can involve identifying and removing some or all of the retrieval code, conditional code, comparison code, branch code, subsequent code, other code, or a combination thereof. Customization component 154 can remove data corresponding to some or all of the retrieval code to stop the hardware initialization code from attempting to retrieve configuration data, which may now be embedded in the hardware initialization code. Customization component 154 can also or alternatively remove data corresponding to the conditional code to reduce the number of optional code paths that can be traversed when the hardware initialization code is executed. In one example, removing the data corresponding to the conditional code can result in the hardware initialization code including a single code path that is free of all conditional code and branching code. The hardware initialization code having the single code path may or may not be free of all the subsequent code, which is now dead code (e.g., code that no code path traverses).

Code receiving module 224 can enable the computing device executing supervisor 140 to receive the hardware initialization code. In one example, the supervisor 140 can receive the hardware initialization code over computer network 120 from service 150. In other examples, the virtual machine 114 and/or trusted execution environment 112 can receive the hardware initialization code over computer network 120 from service 150. In either example, the hardware initialization code can be received in an encrypted form or unencrypted form and supervisor 140 may or may not have access to the unencrypted version of the hardware initialization code.

Receiving the configuration data from the service can involve directly receiving or indirectly receiving the configuration data from service 150. Directly receiving the configuration data can involve supervisor 140 receiving configuration data 130 from service 150. This can involve receiving network messages that were generated by service 150 and include are addressed to the computing device executing supervisor 140 (e.g., network address of computing device 110A). Indirectly receiving the configuration data can involve receiving the configuration data over a computer network from an intermediate device or storage location. The service 150 may generate network messages that include the configuration data and are addressed to the intermediate device (e.g., intermediate storage location) that is different from the computing device executing supervisor 140.

Code receiving module 224 can also receive integrity data 132 for the hardware initialization code. Integrity data 132 (e.g., code integrity data) can be generated by service 150 and can be used by supervisor 140, virtual machine 114, trusted execution environment 112, other portion of host device, or a combination thereof to verify that the received or loaded hardware initialization code is the same as the hardware initialization code that was sent by service 150.

Code deployment component 146 can enable supervisor 140 to manage the deployment of the received hardware initialization code into one or more virtual machines. In one example, code deployment component 146 can include a VM updating module 230, a verification module 232, a secret providing module 234, and a VM execution module 236.

VM updating module 230 can enable supervisor 140 to update the virtual machine to include the received hardware initialization code. The update can involve moving data from a first storage location (e.g., secondary storage device or host memory) to a second storage location (e.g., virtual machine memory). The update can also or alternatively involve remapping memory of the virtual machine so that the virtual machine has access to the storage location that includes the received hardware initialization code. In one example, the memory of the virtual machine may be absent host initialization code before the updating. In another example, the memory of the virtual machine may include existing host initialization code (e.g., code provided by host device) and the memory may be updated to replace or supplement some or all of the existing host initialization code with the received hardware initialization code. In either example, updating the virtual machine can involve supervisor 140 causing (e.g., instructing) the host device to load the received hardware initialization code into a portion of host memory that is accessible to virtual machine 114 (e.g., guest physical memory). The updating of the virtual machine can occur after, before, or during the establishment of the trusted execution environment that executes the virtual machine. The updating may involve copying, moving, remapping, modifying, or other action affecting the virtual machine and/or hardware initialization code 135.

In one example, updating the virtual machine can involve updating the trusted execution environment that is executing the virtual machine. The process of updating the virtual machine may involve copying data from an untrusted area to a trusted storage area, trusted processor area, other storage area, or a combination thereof. As discussed below in regards to FIG. 3, trusted execution environment 112 may store the data of virtual machine 114 in an encrypted storage area and the updating may involve the processor receiving the data in an encrypted form over a bus from the encrypted storage area (e.g., retrieving data via trusted TO). Trusted execution environment 112 may include or be associated with a particular portion of memory (e.g., specific range of addresses) and a particular portion of the processor (e.g, particular core) and the data that is loaded into the trusted execution environment 112 may be accessible to the computing process and inaccessible to the kernel prior to the enabling.

Verification module 232 can be executed by supervisor 140 and enable service 150 to verify that the virtual machine includes the received hardware initialization code 135. Verification module 232 can be the same or similar to attestation module 210 discussed above and can generate integrity data that represents the state of the virtual machine. The integrity data can be generated based on the content of the virtual machine memory before, during, or after the virtual machine is first executed. The integrity data can be transmitted to service 150 and service 150 can use VM verification component 156 to perform a verification check to determine whether the virtual machine (e.g., guest physical memory) includes the received hardware initialization code. If the verification check is successful, service 150 can send a secret 235 to supervisor 140, virtual machine 114, trusted execution environment 112, or a combination thereof.

Secret providing module 234 can enable supervisor 140 to provide secret 235 to virtual machine 114. Providing the secret to the virtual machine may be the same or similar to the updating discussed above in regards to VM updating module 230. In one example, providing the secret 235 can involve injecting secret 235 into the virtual machine by updating the memory of the virtual machine to include secret 235.

Secret 235 may be received in an encrypted or unencrypted form and may include data that enables the virtual machine to access stored data (e.g., decrypt an encrypted VM Image). Secret 235 may be a cryptographic bit sequence that exists in a human readable form (e.g., passcode, password), a non-human readable form (e.g., digital token or digital certificate), other form, or a combination thereof. Secret 235 may be input to a cryptographic function, output of a cryptographic function, or a combination thereof. In one example, secret 235 may be a cryptographic key (e.g., decryption key, authentication key, access key, unwrap key) that enables a virtual machine to access the data storage. In another example, secret 235 can be cryptographic data that is used as input to generate the cryptographic key to access the data storage. In either example, the cryptographic key may be a decryption key for decrypting the storage (e.g., content encryption key (CEK)) or for decrypting an encrypted key (e.g., key-encryption key (KEK), wrapping key, unwrapping key). In either example, secret 235 and/or the cryptographic key may be or include one or more symmetric keys, encryption keys, wrap keys, asymmetric keys, decryption keys, session keys, transport keys, migration keys, authentication keys, authorization keys, digital certificates, integrity keys, verification keys, digital tokens, license keys, signatures, hashes, other data or data structure, or a combination thereof.

VM execution module 236 may enable supervisor 140 to cause the virtual machine to begin executing hardware initialization code 135. Hardware initialization code 135 may enable the virtual machine to start the boot process and initialize computing resources of the host device that have been assigned to the virtual machine (e.g., vCPU, guest physical memory). The hardware initialization code 135 can include configuration data (e.g., hard coded resource identifiers) and can avoid retrieving the configuration information from the host device. Hardware initialization code 135 can use the embedded configuration data to initialize the computing resources and can access and transition execution to code of a guest kernel. The guest kernel can continue the boot process and use secret 235 to access storage of the virtual machine (e.g., VM Image) that can include the guest operating system, application, other executable and confidential data, or a combination thereof.

Figure 3:
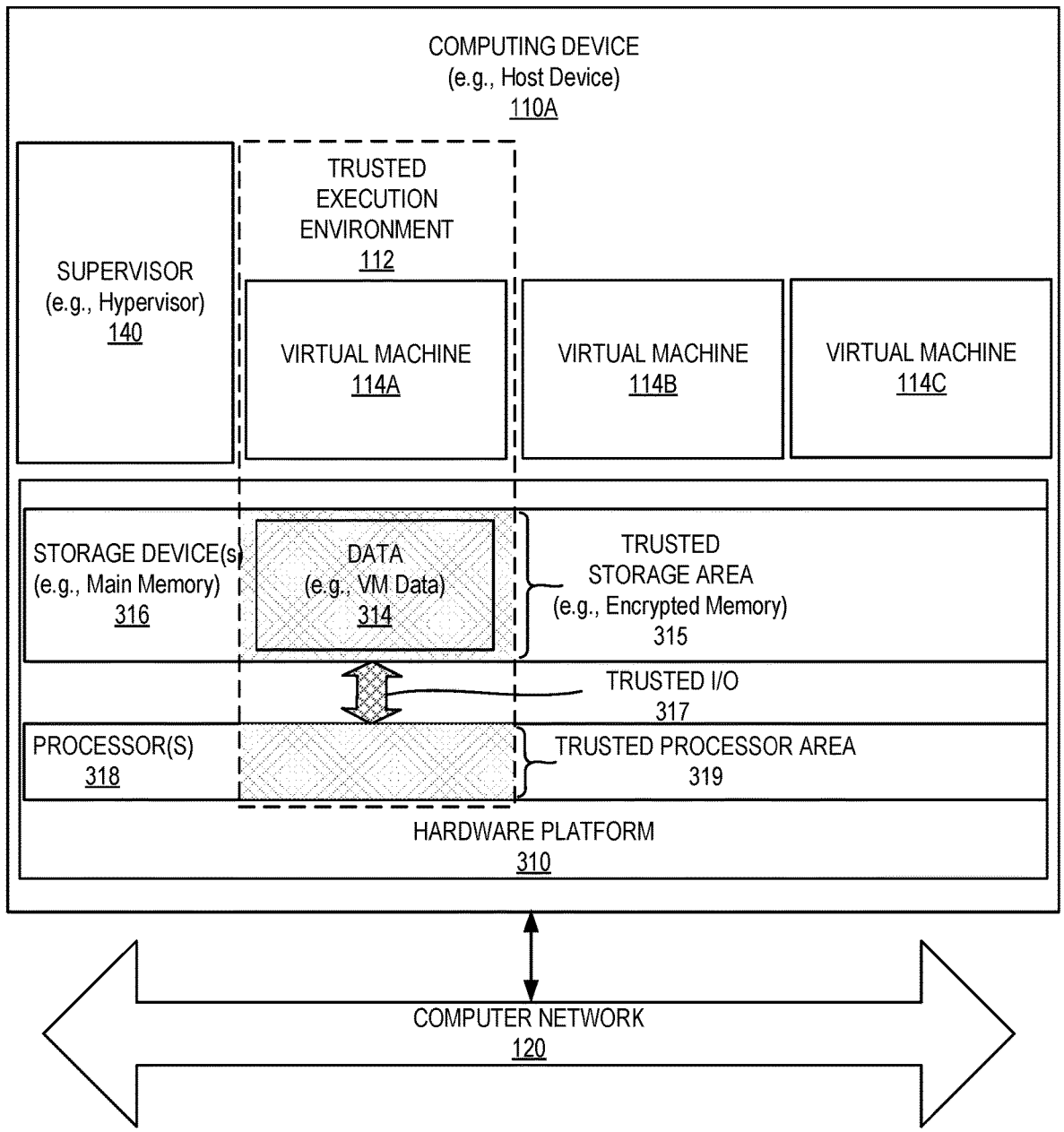
FIG. 3 depicts a block diagram of an example trusted execution environment that can execute a virtual machine that includes the customized hardware initialization code, in accordance with one or more aspects of the present disclosure.

FIG. 3 depicts a block diagram of an example trusted execution environment 112 established on computing device 110A, in accordance with an embodiment of the present disclosure. In the example illustrated, computing device 110A may include a hardware platform 310, a trusted execution environment 112, a supervisor 140, one or more virtual machines 114A-C, and a computer network 120. It should be noted that other architectures for computing device 110A are possible, and that the implementations of the computing device utilizing embodiments of the disclosure are not necessarily limited to the specific architecture depicted.

Hardware platform 310 may include one or more hardware devices that perform computing tasks for computing device 110A. Hardware platform 310 may include one or more data storage devices, computer processors, Basic Input Output services (BIOS), firmware code, other aspects, or a combination thereof. One or more devices of the hardware platform 310 may be combined or consolidated into one or more physical devices or may partially or completely emulated as a virtual device or virtual machine. Hardware platform 310 may provide a Trusted Computing Base (TCB) that can be used to establish a trusted execution environment 112. In the example in FIG. 3, hardware platform 310 may include one or more storage devices 316 and processors 318.

Storage devices 316 may include any data storage device that is capable of storing data and may include physical memory devices. The physical memory devices may include volatile memory devices (e.g., RAM, DRAM, SRAM), non-volatile memory devices (e.g., NVRAM, PMEM, ROM, NAND), other types of memory devices, or a combination thereof. Storage devices 316 may also or alternatively include mass storage devices, such as hard drives (e.g., Hard Disk Drives (HDD)), solid state storage (e.g., Solid State Drives (SSD)), other persistent data storage, or a combination thereof. Storage devices 316 may be capable of storing data 314 associated with virtual machines 114A. In one example, data 314 may be received from a device that is internal or external to computing device 110A. Data may be encrypted using a cryptographic key that was provided (e.g., determined, derived, generated, assigned) by computing device 110A or by a different computing device. The received data may be decrypted using the same cryptographic key or a derivative of the cryptographic key and the decrypted data may be loaded into the trusted execution environment 112 (as shown by data 314) before, during or after being re-encrypted.

Processors 318 (e.g., processing device) may be communicably coupled to storage devices 316 and be capable of executing instructions encoding arithmetic, logical, or I/O operations. Processors 318 may include one or more general processors, Central Processing Units (CPUs), secure cryptoprocessors (e.g., Hardware Security Module (HSM), Trusted Platform Module (TPM)), Application Specific Integrated Circuits (ASICs), Field Programmable Gate Arrays (FPGAs), Graphical Processing Units (GPUs), Data Processing Units (DPUs), other processing unit, or a combination thereof. Processors 318 may be a single core processor, which may be capable of executing one instruction at a time (e.g., single pipeline of instructions) or a multi-core processor, which may simultaneously execute multiple instructions. Processors 318 may interact with storage devices 316 and provide one or more features defined by Confidential Computing Consortium (CCC), Trusted Computing Group (TCG), other organization, or a combination thereof.

Processors 318 (e.g., CPU, processing device) may establish a trusted execution environment across multiple hardware devices of hardware platform 310 (e.g., processor and storage devices) and may include instructions (e.g., opcodes) to initiate, configure, and maintain the trusted execution environment 112. In one example, a trusted execution environment may be implemented using Secure Encrypted Virtualization™ (SEV) provided by AMD™, Trusted Domain Extensions™ (TDX) provided by Intel™, Software Guard eXtensions™ (SGX) provided by Intel™, TrustZone™ provided by ARM™, Secure Execution provided by IBM™, MultiZone™ provided RISC-V™, Secure Execution Environment provide by Qualcomm (QSEE), other technology, or a combination thereof.

Trusted execution environment 112 may be a security enhanced area in computing device 110A that may guard the data of a computing process that is providing a service from being accessed by other computing processes on computing device 110A. A trusted execution environment (TEE) may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environment 112 may be the same or similar to a trust zone (e.g., ARM TrustZone®), trust domain (e.g., Intel Trust Domain™), other term, or a combination hereof and may include one or more enclaves, realms, curtained memory. Trusted execution environment 112 may protect data 314 while data 314 is in use (e.g., processed by processor 318), is in motion (e.g., transmitted over computer network 120), is at rest (e.g., stored in a persistent data storage device), or a combinational thereof. Trusted execution environment 112 may be a set of one or more trusted execution environments and each of the trusted execution environments may be referred to as an instance of a trusted execution environment (i.e., TEEi). Each trusted execution environment 112 may isolate data of at least one process executed in trusted execution environment 112 from processes executing external to the trusted execution environment. The at least one process may be a set of one or more processes associated with an execution construct being guarded by the trusted execution environment 112.

The execution construct may be a virtual machine, container, computing process, thread, instruction stream, or a combination thereof. In the example illustrated in FIG. 3, trusted execution environment 112 may execute a particular virtual machine (e.g. VM based TEE) and may guard data of the virtual machine from a hypervisor managing the virtual machine. In this example, computing device 110A may execute executable code in trusted execution environment 112 as a virtual machine process and the executable code and data in the trusted execution environment may be accessible to the virtual machine process and inaccessible to a hypervisor managing the virtual machine process. As such, the trusted execution environment 112 of computing device may host a virtual machine that executes the executable data and all the data in the trusted execution environment may be accessible to the virtual machine and inaccessible to a hypervisor managing the virtual machine.

In another examples (not shown), trusted execution environment 112 may be associated with a particular computing process (e.g., process based TEE or container based TEE) and may guard data of the particular computing process from being accessed by other equally privileged, higher privileged, or lower privileged computing processes (e.g., guard application process against higher privileged Operating System (OS) process). In this example, computing device 110A may execute the executable code in trusted execution environment 112 as one or more application processes and the executable code in the trusted execution environment 112 may be accessible to the one or more application processes and inaccessible to a supervisor (e.g., kernel or container runtime) managing the one or more application processes. As such, trusted execution environment 112 of computing device 110A may host one or more application processes that execute the executable data and the data in the trusted execution environment may be accessible to the one or more application processes and be inaccessible to a kernel managing the one or more application processes. In either example, the data in the trusted execution environment 112 may be guarded by storing the data 314 in a trusted storage area 315.

Trusted storage area 315 may be an area of one or more storage devices 316 that stores data of a computing process in an encrypted form (e.g., ciphertext). As shown in FIG. 3, trusted storage area 315 may be a part of trusted execution environment 112 and may store data 314 of virtual machine 114A in an encrypted form. Data 314 may be encrypted and decrypted by hardware devices using cryptographic input that includes one or more cryptographic keys. In one example, the cryptographic keys may be accessible to the hardware devices (e.g., processor 318) and may be inaccessible to operating system level processes and threads executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, hardware isolation, process transparent encryption, container transparent encryption, virtual machine transparent encryption, or other term and may use cryptographic key data (e.g., encryption and decryption keys) that are accessible to the processor and are inaccessible to all processes executed external to the trusted execution environment 112.

Trusted storage area 315 may include a portion of memory and may be referred to as an encrypted memory area. The encrypted memory area may be a contiguous or non-contiguous portion of virtual memory, logical memory, physical memory, other storage abstraction, or a combination thereof. The encrypted memory area may correspond to or be mapped to a portion of processor cache (CPU L1, L2, L3 cache), primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and a processor may encrypt the data when storing the data in the memory area and may decrypt the data when retrieving the data from the memory area. In another example, the encrypted memory area may be portions of main memory and CPU cache that are associated with a particular process. One or more processors (e.g., CPU and cryptoprocessor) may encrypt the data of a memory unit (e.g., page, block, frame, cache line) when storing the data in the memory area and may decrypt the data when retrieving the data from the memory area. In either example, the data in the memory area may be transformed (e.g., encrypted or decrypted) before, during, or after it is stored in or retrieved from the memory area and may remain in an encrypted form while in the encrypted memory area.

Trusted storage area 315 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 315 may be transmitted to other hardware devices using trusted IO 317.

Trusted IO 317 may enable the data of a computing process to be transmitted between hardware devices in a security enhanced manner. The data may be transmitted over one or more system buses, computer networks, or other communication channel in an encrypted or partially encrypted form. This may be advantageous because transmitting the data in an encrypted form may limit the ability of the data to be snooped or sniffed while being transmitted between or within hardware devices. As shown in FIG. 3, trusted IO 317 may enable the data of virtual machine 114A to be transmitted within and between trusted storage area 315 and trusted processor area 319.

Trusted processor area 319 may be a portion of processor 318 that is associated with virtual machine 114A and guards data of virtual machine 114 from being accessed any process executing outside the scope of virtual machine 114A. Trusted processor area 319 may include a portion of processor 318 that stores the data (e.g., CPU cache, processor memory or registers) and a portion of processor 318 that executes the data (e.g., processor core). Trusted processor area 319 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging) or within particular levels of cache. For example, data may be encrypted in higher levels of cache (e.g., L4, L3, L2) and remain unencrypted in lower levels of cache (e.g., L1 instruction and L1 data).

Virtual machines 114A-C may be unaware they are executing in a trusted execution environment because the TEE features can be provided by hardware processors at a lower level. However, the hardware platform (e.g., CPU) may provide an API with instructions that enable a virtual machine or program executed by the virtual machine to determine it is running in a trusted execution environment (e.g., see local attestation above). Each of the virtual machines 114A-C may be managed by supervisor 140. In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Supervisor 140 may include one or more programs that are run to manage one or more of the virtual machines 114A-C. Supervisor 140 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, supervisor 140 may be a hypervisor, host operating system, or combination thereof.

Figure 4:
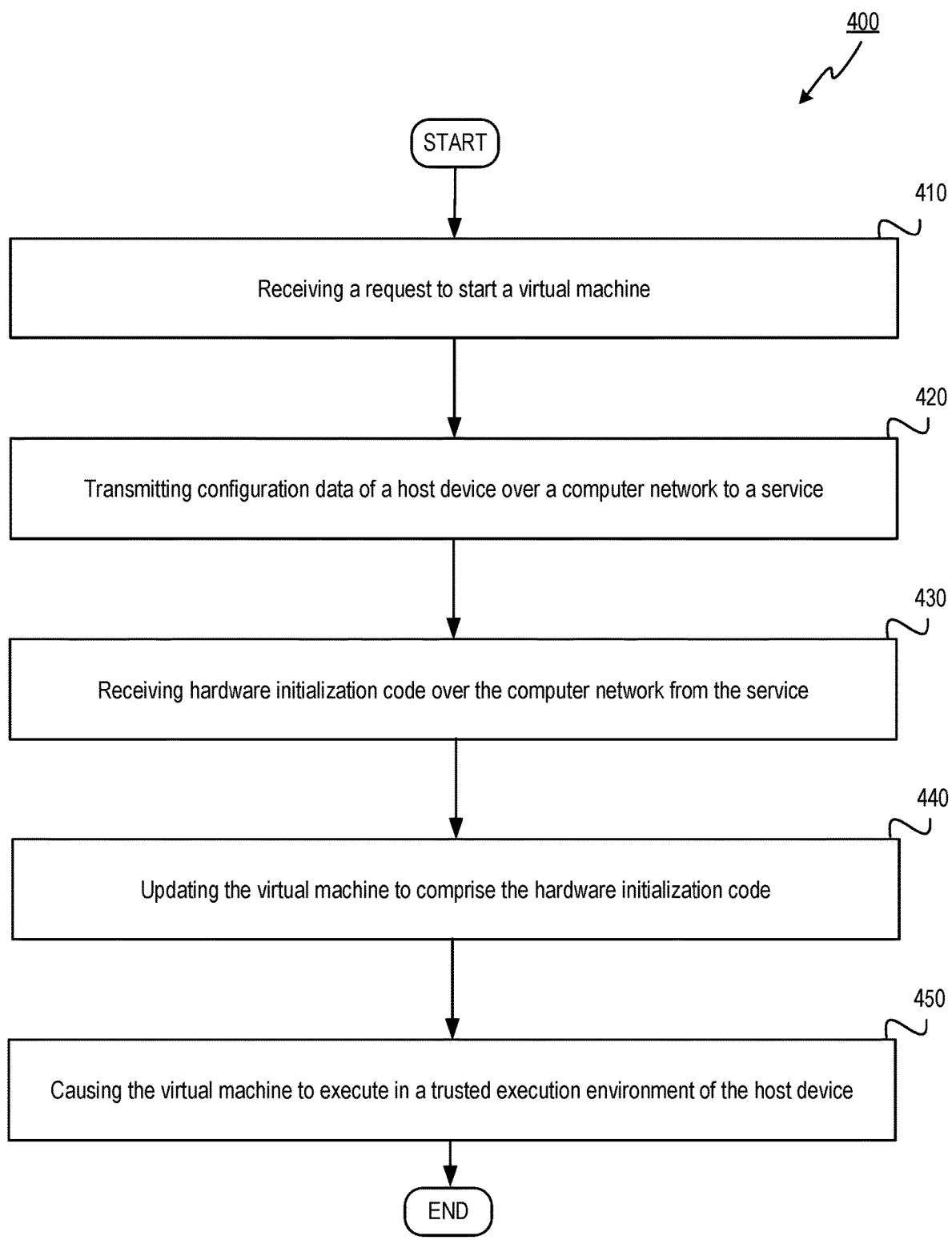
FIG. 4 depicts a flow diagram of an example method to customize the hardware initialization code used to boot a virtual machine, in accordance with one or more aspects of the present disclosure.

FIG. 4 depicts a flow diagram of one illustrative example of a method 400 for customizing hardware initialization code used to boot virtual machines, in accordance with one or more aspects of the present disclosure. Method 400 and each of its individual functions, routines, subroutines, or operations may be performed by one or more processors of the computing device executing the method. In certain implementations, method 400 may be performed by a single computing device (e.g., host device). Alternatively, method 400 may be performed by two or more computing devices (e.g., a host device and a provisioning/orchestration device), each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by code customization component 144 and code deployment component 146 as shown in FIGS. 1 and 2 and may begin at block 410.

At block 410, the processing device may receive a request to start a virtual machine or any other virtualized execution environment such as a container. The request may be received by a program executing on the host device or from a program executing on another computing device (e.g., provisioning device, orchestration device, guest device, computing device 110Z), or a combination thereof.

At block 420, the processing device may transmit configuration data of the host device over a computer network to a service. The configuration data may include at least one resource identifier of the host device. In one example, the resource identifier can include multiple resource identifier that are subsequently embedded into the hardware initialization code and include one or more CPU identifiers, memory identifiers, other identifiers, or a combination thereof. The configuration data of the host device may also or alternatively describe computing resources available to the virtual machine and indicates at least one of a CPU quantity, a memory capacity, an instruction set architecture (ISA), and an indication of hardware-level encryption. In one example, transmitting configuration data of the host device may involve transmitting configuration data that includes attestation data. The attestation data may enable the service to verify the integrity of the host device.

At block 430, the processing device may receive hardware initialization code over the computer network from the service. The hardware initialization code can include the resource identifier of the host device. In one example, the hardware initialization code can be customized by the service before, during, or after the service receives the configuration data. The customizing can involve selecting hardware initialization code (e.g., template code) from a set of hardware initialization code candidates based on the configuration data and updating the selected hardware initialization code. The updating can involve adding (e.g., hard coding, embedding, or including) the configuration data and removing (e.g., replacing, deleting, excluding) code that retrieves configuration data from a hypervisor or host operating system of the host device.

At block 440, the processing device may update the virtual machine to comprise the hardware initialization code. In one example, the hardware initialization code comprises code of a first stage boot loader and the virtual machine executes the hardware initialization code to initialize computing resources of the host device before accessing code of a guest operating system from a VM image. In one example, the processing device can execute a supervisor (e.g., hypervisor and/or host OS) that provides integrity data over the computer network to the service. The integrity data can indicate the virtual machine includes the hardware initialization code received from the service. Responsive to the service verifying the integrity data, the supervisor can receive an encrypted secret over the computer network from the service. The encrypted secret can be or include a decryption key that is encrypted (e.g., wrapped decryption key). The supervisor can provide the encrypted secret to the virtual machine (e.g., inject encrypted secret into memory of VM). The encrypted secret may enable the virtual machine to access storage that includes a guest operating system for the virtual machine (e.g., decrypt an encrypted VM Image).

At block 450, the processing device may cause the virtual machine to execute in a trusted execution environment of the host device, wherein the virtual machine executes the hardware initialization code and uses the resource identifier. The hardware initialization code can be hard coded to include the resource identifier and can include a single code path and be absent all other code paths. The single code path can be free of conditional code, branching code, subsequent code, other code, or a combination thereof. Responsive to completing the operations described herein above, method 400 may terminate.

Figure 5:
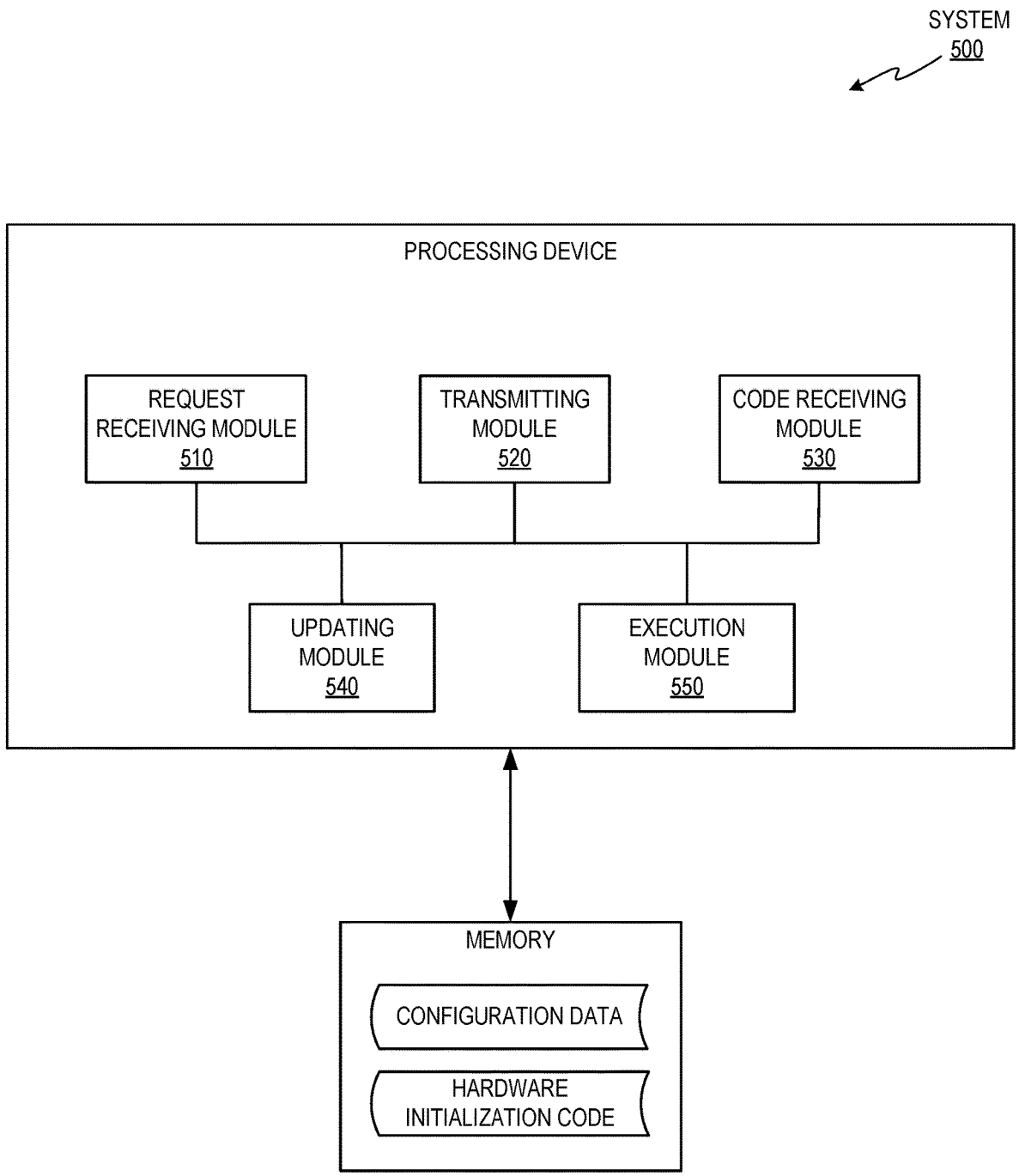
FIG. 5 depicts a block diagram of an example computer system that uses customized hardware initialization code to boot a virtual machine, in accordance with one or more aspects of the present disclosure.

FIG. 5 depicts a block diagram of a computer system 500 operating in accordance with one or more aspects of the present disclosure. Computer system 500 may be the same or similar to computing device 110A of FIGS. 1-3 or computer system 700 of FIG. 7 and may include one or more processing devices and one or more memory devices. In the example shown, computer system 500 may include a request receiving module 510, a transmitting module 520, a code receiving module 530, an updating module 540, and an execution module 550.

Request receiving module 510 may enable a processing device to receive a request to start a virtual machine. The request may be received by a program executing on the host device or from a program executing on another computing device (e.g., provisioning device, orchestration device, guest device, computing device 110Z), or a combination thereof.

Transmitting module 520 may enable the processing device to transmit configuration data of the host device over a computer network to a service. The configuration data may include at least one resource identifier of the host device. In one example, the resource identifier can include multiple resource identifier that are subsequently embedded into the hardware initialization code and include one or more CPU identifiers, memory identifiers, other identifiers, or a combination thereof. The configuration data of the host device may also or alternatively describe computing resources available to the virtual machine and indicates at least one of a CPU quantity, a memory capacity, an instruction set architecture (ISA), and an indication of hardware-level encryption. In one example, transmitting configuration data of the host device may involve transmitting configuration data that includes attestation data. The attestation data may enable the service to verify the integrity of the host device.

Code receiving module 530 may enable the processing device to receive hardware initialization code over the computer network from the service. The hardware initialization code can include the resource identifier of the host device. In one example, the hardware initialization code can be customized by the service before, during, or after the service receives the configuration data. The customizing can involve selecting hardware initialization code (e.g., template code) from a set of hardware initialization code candidates based on the configuration data and updating the selected hardware initialization code. The updating can involve adding (e.g., hard coding, embedding, or including) the configuration data and removing (e.g., replacing, deleting, excluding) code that retrieves configuration data from a hypervisor or host operating system of the host device.

Updating module 540 may enable the processing device to update the virtual machine to comprise the hardware initialization code. In one example, the hardware initialization code comprises code of a first stage boot loader and the virtual machine executes the hardware initialization code to initialize computing resources of the host device before accessing code of a guest operating system from a VM image. In one example, the processing device can execute a supervisor (e.g., hypervisor and/or host OS) that provides integrity data over the computer network to the service. The integrity data can indicate the virtual machine includes the hardware initialization code received from the service. Responsive to the service verifying the integrity data, the supervisor can receive an encrypted secret over the computer network from the service. The encrypted secret can be or include a decryption key that is encrypted (e.g., wrapped decryption key). The supervisor can provide the encrypted secret to the virtual machine (e.g., inject encrypted secret into memory of VM). The encrypted secret may enable the virtual machine to access storage that includes a guest operating system for the virtual machine (e.g., decrypt an encrypted VM Image).

Execution module 550 may enable the processing device to cause the virtual machine to execute in a trusted execution environment of the host device, wherein the virtual machine executes the hardware initialization code and uses the resource identifier. The hardware initialization code can be hard coded to include the resource identifier and can include a single code path and be absent all other code paths. The single code path can be free of conditional code, branching code, subsequent code, other code, or a combination thereof.

Figure 6:
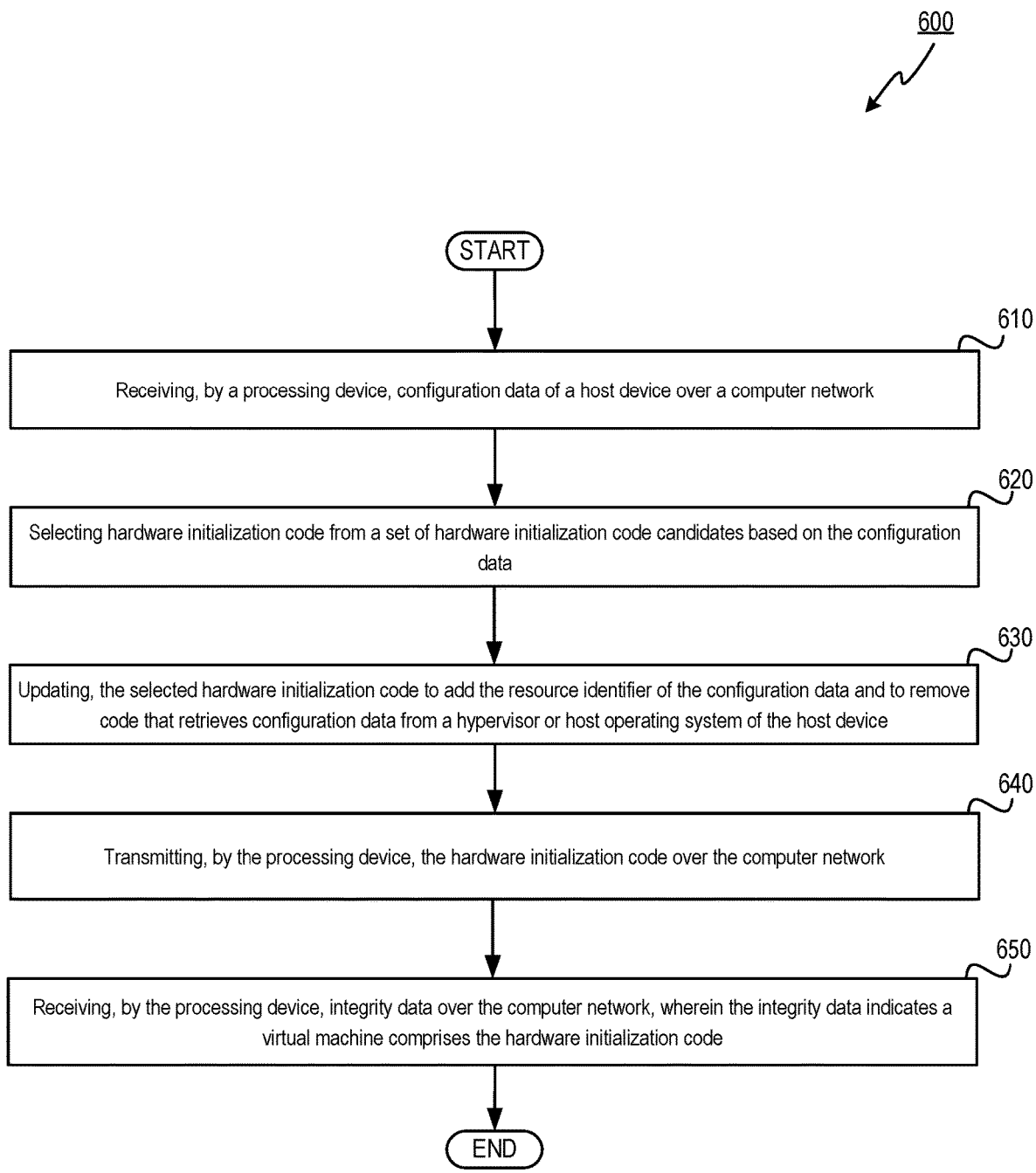
FIG. 6 depicts a flow diagram of another example method to customize the hardware initialization code used to boot a virtual machine, in accordance with one or more aspects of the present disclosure.

FIG. 6 depicts a flow diagram of one illustrative example of a method 600 for customizing hardware initialization code used to boot virtual machines, in accordance with one or more aspects of the present disclosure. FIG. 6 and method 600 may be the same or similar to FIG. 5 and method 500 discussed above and may begin at block 610.

At block 610, a processing device may receive configuration data of a host device over a computer network, wherein the configuration data comprises a resource identifier of the host device. In one example, the resource identifier can include multiple resource identifier that are subsequently embedded into the hardware initialization code and include one or more CPU identifiers, memory identifiers, other identifiers, or a combination thereof. The configuration data of the host device may also or alternatively describe computing resources available to the virtual machine and indicates at least one of a CPU quantity, a memory capacity, an instruction set architecture (ISA), and an indication of hardware-level encryption. In another example, receiving configuration data of the host device may involve receiving configuration data that includes attestation data. The attestation data may enable the processing device to verify the integrity of the host device.

At block 620, the processing device may select hardware initialization code from a set of hardware initialization code candidates based on the configuration data. The selected hardware initialization code can function as template code that is customized based on the configuration data. In one example, the hardware initialization code can be customized before, during, or after the service receives the configuration data or selects the hardware initialization code.

At block 630, the processing device may update the selected hardware initialization code to add the resource identifier of the configuration data and to remove code that retrieves configuration data from a hypervisor or host operating system of the host device. The updating can involve adding (e.g., hard coding, embedding, or including) the configuration data and removing (e.g., replacing, deleting, excluding) code that retrieves configuration data from a hypervisor or host operating system of the host device.

At block 640, the processing device may transmit the hardware initialization code over the computer network. The hardware initialization code can be hard coded to include the resource identifier and can include a single code path and be absent all other code paths. The single code path can be free of conditional code, branching code, subsequent code, other code, or a combination thereof. The hardware initialization code comprises code of a first stage boot loader and the virtual machine executes the hardware initialization code to initialize computing resources of the host device before accessing code of a guest operating system from a VM image.

At block 650, the processing device may receive integrity data over the computer network, wherein the integrity data indicates a virtual machine comprises the hardware initialization code. In one example, the processing device can execute the service (e.g., guest owner service) that receives the integrity data from a supervisor running on the host device (e.g., host owned device). The integrity data can indicate the virtual machine includes the received hardware initialization code and the hardware initialized code has not been modified (e.g., maliciously, accidentally, or otherwise). Responsive to verifying the integrity data, the processing device can transmit an encrypted secret over the computer network to the host device (e.g., supervisor or virtual machine). The encrypted secret can be or include a decryption key that is encrypted (e.g., wrapped decryption key). The supervisor can provide the encrypted secret to the virtual machine (e.g., inject encrypted secret into memory of VM). The encrypted secret may enable the virtual machine to access storage that includes a guest operating system for the virtual machine (e.g., decrypt an encrypted VM Image). Responsive to completing the operations described herein above, method 600 may terminate.

Figure 7:
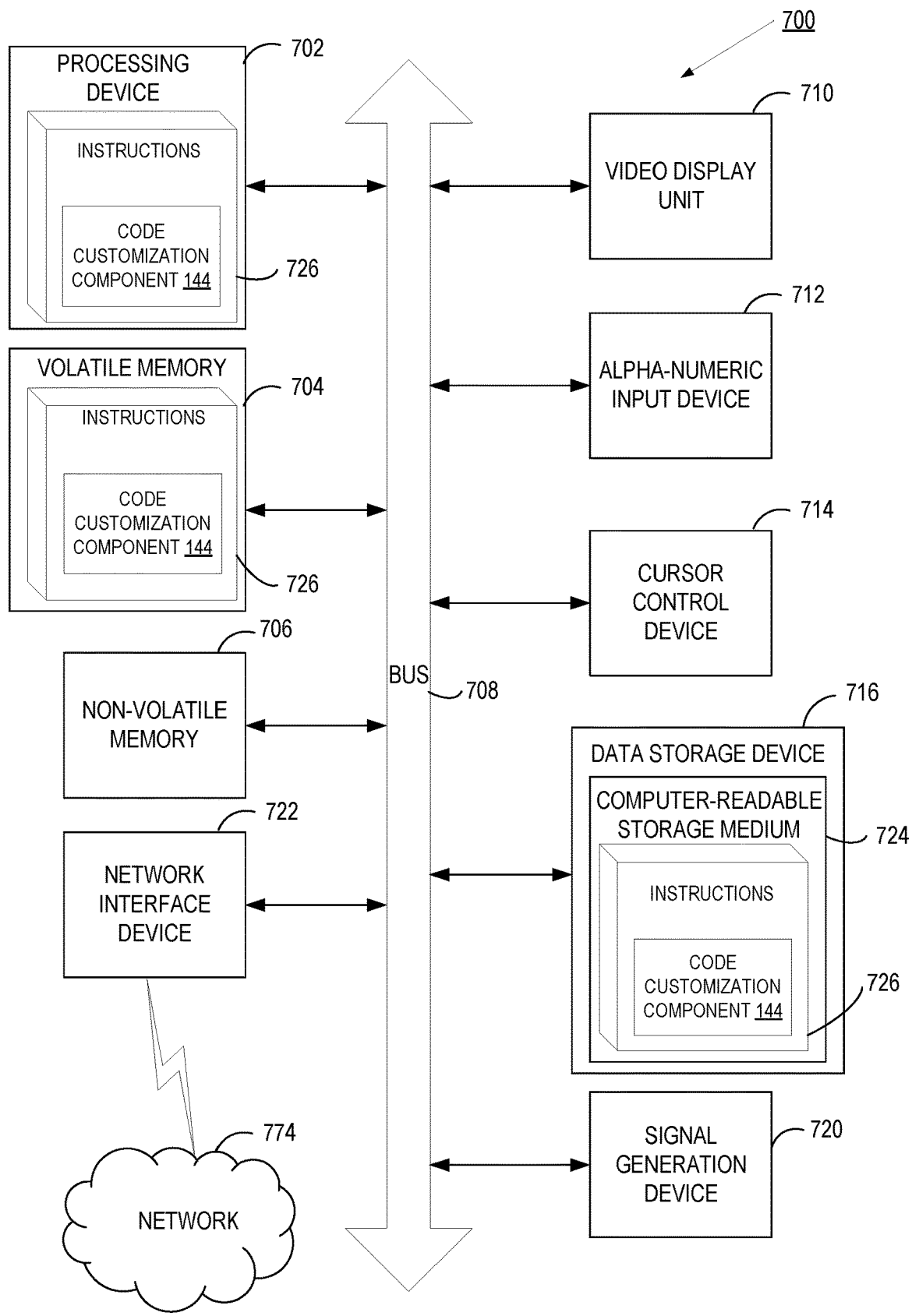
FIG. 7 depicts a block diagram of example computer system operating in accordance with the examples of the present disclosure.

FIG. 7 depicts a block diagram of a computer system operating in accordance with one or more aspects of the present disclosure. In various illustrative examples, computer system 700 may correspond to computing device 110A-Z. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 and 600, and for encoding code customization component 144.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving a request to start a virtual machine; transmitting, by a processing device, configuration data of a host device over a computer network to a service, wherein the configuration data comprises a resource identifier of the host device; receiving hardware initialization code over the computer network from the service, wherein the hardware initialization code comprises the resource identifier; updating, by the processing device, the virtual machine to comprise the hardware initialization code; and causing the virtual machine to execute in a trusted execution environment of the host device, wherein the virtual machine executes the hardware initialization code and uses the resource identifier.

Example 2 is a method of example 1, wherein the hardware initialization code comprises code of a first stage boot loader and the virtual machine executes the hardware initialization code to initialize computing resources of the host device before accessing code of a guest operating system from a VM Image.

Example 3 is a method of any of examples 1-2, further comprising customizing the hardware initialization code, wherein the customizing comprises: selecting, by the service, hardware initialization code from a set of hardware initialization code candidates based on the configuration data; and updating, by the service, the selected hardware initialization code to add the configuration data and to remove code that retrieves configuration data from a hypervisor or host operating system of the host device.

Example 4 is a method of any of examples 1-3, wherein the hardware initialization code is hard coded to include the resource identifier and comprises a single code path that is free of conditional code and free of branching code.

Example 5 is a method of any of examples 1-4, wherein the configuration data of the host device describes computing resources available to the virtual machine and indicates at least one of a CPU quantity, a memory capacity, an instruction set architecture (ISA), and an indication of hardware-level encryption.

Example 6 is a method of any of examples 1-5, wherein the resource identifier comprises a plurality of resource identifier that are embedded into the hardware initialization code and comprise a CPU identifier and a memory identifier.

Example 7 is a method of any of examples 1-6, further comprising: providing, by the processing device executing a hypervisor, integrity data over the computer network to the service, wherein the integrity data indicates the virtual machine comprises the hardware initialization code received from the service; receiving, by the hypervisor, an encrypted secret over the computer network from the service, wherein the encrypted secret comprises a decryption key that is encrypted; and providing, by the hypervisor, the encrypted secret to the virtual machine, wherein the encrypted secret enables the virtual machine to access storage comprising a guest operating system.

Example 8 is a method of any of examples 1-7, wherein transmitting configuration data of the host device over the computer network to the service comprises transmitting configuration data that comprises attestation data, wherein the attestation data enables the service to verify an integrity of the host device.

Example 9 is a system comprising: a memory; and a processing device communicably coupled to the memory, to perform operations comprising: receiving a request to start a virtual machine; transmitting, by a processing device, configuration data of a host device over a computer network to a service, wherein the configuration data comprises a resource identifier of the host device; receiving hardware initialization code over the computer network from the service, wherein the hardware initialization code comprises the resource identifier; updating, by the processing device, the virtual machine to comprise the hardware initialization code; and causing the virtual machine to execute in a trusted execution environment of the host device, wherein the virtual machine executes the hardware initialization code and uses the resource identifier.

Example 10 is a system of any of examples 1-9, wherein the hardware initialization code comprises code of a first stage boot loader and the virtual machine executes the hardware initialization code to initialize computing resources of the host device before accessing code of a guest operating system from a VM Image.

Example 11 is a system of any of examples 1-10, wherein the operations further comprise: selecting, by the service, hardware initialization code from a set of hardware initialization code candidates based on the configuration data; and updating, by the service, the selected hardware initialization code to add the configuration data and to remove code that retrieves configuration data from a hypervisor or host operating system of the host device.

Example 12 is a system of any of examples 1-11, wherein the hardware initialization code is hard coded to include the resource identifier and comprises a single code path that is free of conditional code and free of branching code.

Example 13 is a system of any of examples 1-12, wherein the configuration data of the host device describes computing resources available to the virtual machine and indicates at least one of a CPU quantity, a memory capacity, an instruction set architecture (ISA), and an indication of hardware-level encryption.

Example 14 is a system of any of examples 1-13, wherein the resource identifier comprises a plurality of resource identifier that are embedded into the hardware initialization code and comprise a CPU identifier and a memory identifier.

Example 15 is a system of any of examples 1-14, wherein the operations further comprise: providing, by a hypervisor, integrity data over the computer network to the service, wherein the integrity data indicates the virtual machine comprises the hardware initialization code received from the service; receiving, by the hypervisor, an encrypted secret over the computer network from the service, wherein the encrypted secret comprises a decryption key that is encrypted; and providing, by the hypervisor, the encrypted secret to the virtual machine, wherein the encrypted secret enables the virtual machine to access storage comprising a guest operating system.

Example 16 is a system of any of examples 1-15, wherein transmitting configuration data of the host device over the computer network to the service comprises transmitting configuration data that comprises attestation data, wherein the attestation data enables the service to verify an integrity of the host device.

Example 17 is a non-transitory machine-readable storage medium storing instructions which, when executed, cause a processing device to perform operations comprising: receiving a request to start a virtual machine; transmitting, by a processing device, configuration data of a host device over a computer network to a service, wherein the configuration data comprises a resource identifier of the host device; receiving hardware initialization code over the computer network from the service, wherein the hardware initialization code comprises the resource identifier; updating, by the processing device, the virtual machine to comprise the hardware initialization code; and causing the virtual machine to execute in a trusted execution environment of the host device, wherein the virtual machine executes the hardware initialization code and uses the resource identifier.

Example 18 is a non-transitory machine-readable storage medium of any of examples 1-17, wherein the hardware initialization code comprises code of a first stage boot loader and the virtual machine executes the hardware initialization code to initialize computing resources of the host device before accessing code of a guest operating system from a VM Image.

Example 19 is a non-transitory machine-readable storage medium of any of examples 1-18, wherein the operations further comprise: selecting, by the service, hardware initialization code from a set of hardware initialization code candidates based on the configuration data; and updating, by the service, the selected hardware initialization code to add the configuration data and to remove code that retrieves configuration data from a hypervisor or host operating system of the host device.

Example 20 is a non-transitory machine-readable storage medium of any of examples 1-19, wherein the hardware initialization code is hard coded to include the resource identifier and comprises a single code path that is free of conditional code and free of branching code.

Example 21 is a non-transitory machine-readable storage medium of any of examples 1-20, wherein the configuration data of the host device describes computing resources available to the virtual machine and indicates at least one of a CPU quantity, a memory capacity, an instruction set architecture (ISA), and an indication of hardware-level encryption.

Example 22 is a non-transitory machine-readable storage medium of any of examples 1-21, wherein the resource identifier comprises a plurality of resource identifier that are embedded into the hardware initialization code and comprise a CPU identifier and a memory identifier.

Example 23 is a non-transitory machine-readable storage medium of any of examples 1-22, wherein the operations further comprise: providing, by a hypervisor, integrity data over the computer network to the service, wherein the integrity data indicates the virtual machine comprises the hardware initialization code received from the service; receiving, by the hypervisor, an encrypted secret over the computer network from the service, wherein the encrypted secret comprises a decryption key that is encrypted; and providing, by the hypervisor, the encrypted secret to the virtual machine, wherein the encrypted secret enables the virtual machine to access storage comprising a guest operating system.

Example 24 is a non-transitory machine-readable storage medium of any of examples 1-23, wherein transmitting configuration data of the host device over the computer network to the service comprises transmitting configuration data that comprises attestation data, wherein the attestation data enables the service to verify an integrity of the host device.

Example 25 is a method comprising: receiving, by a processing device, configuration data of a host device over a computer network, wherein the configuration data comprises a resource identifier of the host device; selecting hardware initialization code from a set of hardware initialization code candidates based on the configuration data; updating, the selected hardware initialization code to add the resource identifier of the configuration data and to remove code that retrieves configuration data from a hypervisor or host operating system of the host device; transmitting, by the processing device, the hardware initialization code over the computer network; and receiving, by the processing device, integrity data over the computer network, wherein the integrity data indicates a virtual machine comprises the hardware initialization code.

Example 26 is a method of any of examples 1-25, further comprising: transmitting an encrypted secret over the computer network, wherein the encrypted secret comprises a decryption key and enables the virtual machine to access storage comprising a guest operating system.

Example 27 is a method of any of examples 1-26, wherein receiving configuration data of the host device over the computer network comprises receiving configuration data that comprises attestation data, wherein the attestation data enables a service to verify an integrity of the host device.

Example 28 is a method of any of examples 1-27, wherein the hardware initialization code is hard coded to include the resource identifier and comprises a single code path that is free of conditional code and free of branching code.

Example 29 is a method of any of examples 1-28, wherein the configuration data of the host device describes computing resources available to the virtual machine and indicates at least one of a CPU quantity, a memory capacity, an instruction set architecture (ISA), and an indication of hardware-level encryption.

Example 30 is a device comprising: a means for receiving a request to start a virtual machine; a means for transmitting configuration data of a host device over a computer network to a service, wherein the configuration data comprises a resource identifier of the host device; a means for receiving hardware initialization code over the computer network from the service, wherein the hardware initialization code comprises the resource identifier; a means for updating the virtual machine to comprise the hardware initialization code; and a means for causing the virtual machine to execute in a trusted execution environment of the host device, wherein the virtual machine executes the hardware initialization code and uses the resource identifier.

Although the operations of the methods herein are shown and described in a particular order, the order of the operations of each method may be altered so that certain operations may be removed or performed in an inverse order or so that certain operations may be performed, at least in part, concurrently with other operations. In certain implementations, instructions or sub-operations of distinct operations may be in an intermittent and/or alternating manner.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation or imply any sort of sequence, priority, position, or importance.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used with programs in accordance with the teachings described herein, or it may prove convenient to construct more specialized apparatus to perform the specified method and/or each of its individual functions, routines, subroutines, or operations. Examples of the structure for a variety of these systems are set forth in the description above. In addition, aspects of the present disclosure are not described with reference to any particular programming language. It will be appreciated that a variety of programming languages may be used to implement the teachings of the disclosure as described herein.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a request to start a virtual machine;
   transmitting, by a processing device, configuration data of a host device over a computer network to a service, wherein the configuration data comprises a resource identifier of the host device;
   receiving hardware initialization code over the computer network from the service, wherein the hardware initialization code comprises the resource identifier;
   updating, by the processing device, the virtual machine to comprise the hardware initialization code; and
   causing the virtual machine to execute in a trusted execution environment of the host device, wherein the virtual machine executes the hardware initialization code and uses the resource identifier.

2. The method of claim 1, wherein the hardware initialization code comprises code of a first stage boot loader and the virtual machine executes the hardware initialization code to initialize computing resources of the host device before accessing code of a guest operating system from a VM Image.

3. The method of claim 1, further comprising customizing the hardware initialization code, wherein the customizing comprises:
   selecting, by the service, hardware initialization code from a set of hardware initialization code candidates based on the configuration data; and
   updating, by the service, the selected hardware initialization code to add the configuration data and to remove code that retrieves configuration data from a hypervisor or host operating system of the host device.

4. The method of claim 1, wherein the hardware initialization code is hard coded to include the resource identifier and comprises a single code path that is free of conditional code and free of branching code.

5. The method of claim 1, wherein the configuration data of the host device describes computing resources available to the virtual machine and indicates at least one of a CPU quantity, a memory capacity, an instruction set architecture (ISA), and an indication of hardware-level encryption.

6. The method of claim 1, wherein the resource identifier comprises a plurality of resource identifier that are embedded into the hardware initialization code and comprise a CPU identifier and a memory identifier.

7. The method of claim 1, further comprising:
   providing, by the processing device executing a hypervisor, integrity data over the computer network to the service, wherein the integrity data indicates the virtual machine comprises the hardware initialization code received from the service;
   receiving, by the hypervisor, an encrypted secret over the computer network from the service, wherein the encrypted secret comprises a decryption key that is encrypted; and
   providing, by the hypervisor, the encrypted secret to the virtual machine, wherein the encrypted secret enables the virtual machine to access storage comprising a guest operating system.

8. The method of claim 1, wherein transmitting configuration data of the host device over the computer network to the service comprises transmitting configuration data that comprises attestation data, wherein the attestation data enables the service to verify an integrity of the host device.

9. A system comprising:
a memory; and
a processing device communicably coupled to the memory, to perform operations comprising:
receiving a request to start a virtual machine;
transmitting, by a processing device, configuration data of a host device over a computer network to a service, wherein the configuration data comprises a resource identifier of the host device;
receiving hardware initialization code over the computer network from the service, wherein the hardware initialization code comprises the resource identifier;
updating, by the processing device, the virtual machine to comprise the hardware initialization code; and
causing the virtual machine to execute in a trusted execution environment of the host device, wherein the virtual machine executes the hardware initialization code and uses the resource identifier.

10. The system of claim 9, wherein the hardware initialization code comprises code of a first stage boot loader and the virtual machine executes the hardware initialization code to initialize computing resources of the host device before accessing code of a guest operating system from a VM Image.

11. The system of claim 9, wherein the operations further comprise:
selecting, by the service, hardware initialization code from a set of hardware initialization code candidates based on the configuration data; and
updating, by the service, the selected hardware initialization code to add the configuration data and to remove code that retrieves configuration data from a hypervisor or host operating system of the host device.

12. The system of claim 9, wherein the hardware initialization code is hard coded to include the resource identifier and comprises a single code path that is free of conditional code and free of branching code.

13. The system of claim 9, wherein the configuration data of the host device describes computing resources available to the virtual machine and indicates at least one of a CPU quantity, a memory capacity, an instruction set architecture (ISA), and an indication of hardware-level encryption.

14. The system of claim 9, wherein the resource identifier comprises a plurality of resource identifier that are embedded into the hardware initialization code and comprise a CPU identifier and a memory identifier.

15. The system of claim 9, wherein the operations further comprise:

providing, by a hypervisor, integrity data over the computer network to the service, wherein the integrity data indicates the virtual machine comprises the hardware initialization code received from the service;
receiving, by the hypervisor, an encrypted secret over the computer network from the service, wherein the encrypted secret comprises a decryption key that is encrypted; and
providing, by the hypervisor, the encrypted secret to the virtual machine, wherein the encrypted secret enables the virtual machine to access storage comprising a guest operating system.

16. The system of claim 9, wherein transmitting configuration data of the host device over the computer network to the service comprises transmitting configuration data that comprises attestation data, wherein the attestation data enables the service to verify an integrity of the host device.

17. A non-transitory machine-readable storage medium storing instructions which, when executed, cause a processing device to perform operations comprising:
receiving a request to start a virtual machine;
transmitting, by a processing device, configuration data of a host device over a computer network to a service, wherein the configuration data comprises a resource identifier of the host device;
receiving hardware initialization code over the computer network from the service, wherein the hardware initialization code comprises the resource identifier;
updating, by the processing device, the virtual machine to comprise the hardware initialization code; and
causing the virtual machine to execute in a trusted execution environment of the host device, wherein the virtual machine executes the hardware initialization code and uses the resource identifier.

18. The non-transitory machine-readable storage medium of claim 17, wherein the hardware initialization code comprises code of a first stage boot loader and the virtual machine executes the hardware initialization code to initialize computing resources of the host device before accessing code of a guest operating system from a VM Image.

19. The non-transitory machine-readable storage medium of claim 17, wherein the operations further comprise:
selecting, by the service, hardware initialization code from a set of hardware initialization code candidates based on the configuration data; and
updating, by the service, the selected hardware initialization code to add the configuration data and to remove code that retrieves configuration data from a hypervisor or host operating system of the host device.

20. The non-transitory machine-readable storage medium of claim 17, wherein the hardware initialization code is hard coded to include the resource identifier and comprises a single code path that is free of conditional code and free of branching code.

* * * * *